March 27, 1956
C. D. COXE
2,739,375
JOINING OF NON-METALLIC MATERIALS
AND BRAZING FILLER RODS THEREFOR
Filed Sept. 12, 1952
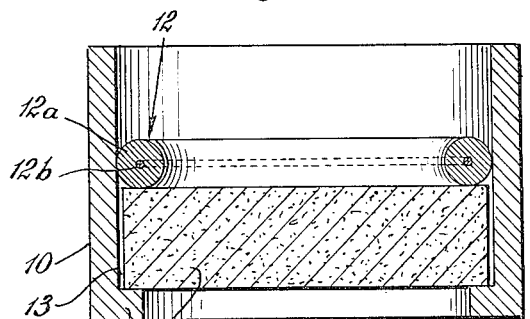
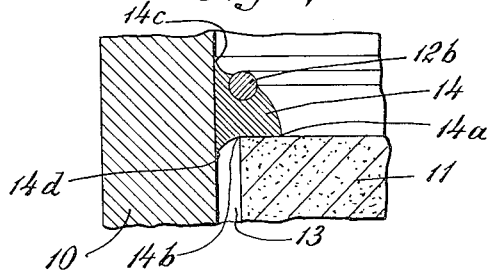
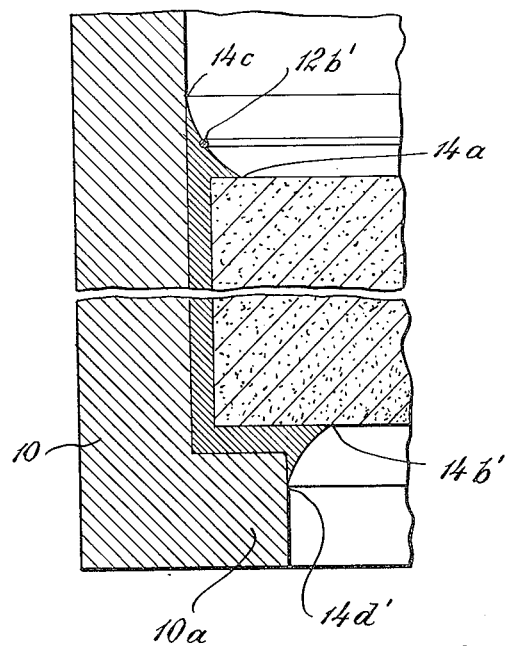
INVENTOR.
Charles D. Coxe
BY
Pennie Edmonds Morton Burrows Taylor
ATTORNEYS United States Patent Office 2,739,375
Patented Mar. 27, 1956

2,739,375

JOINING OF NON-METALLIC MATERIALS AND BRAZING FILLER RODS THEREFOR

Charles D. Coxe, Fairfield, Conn., assignor to Handy & Harman, New York, N. Y., a corporation of New York Application September 12, 1952, Serial No. 309,302

7 Claims. (Cl. 29—472.7)

This invention relates to the joining of objects, at least one of which is non-metallic. More particularly, the invention is concerned with a novel composite metallic material for use as a filler metal in joining by brazing a pair of objects, both of which are non-metallic or one metallic and the other non-metallic, and with a method, by which the new filler metal can be employed to produce strong joints between objects of the kinds identified.

The brazing of non-metallic materials, such as ceramics, graphite, silica, porcelain, diamonds, glass, etc., cannot be carried out by the use of conventional filler metals, of which silver, copper, and silver-copper alloys are typical, because the molten metal will not wet and adhere to non-metallic substances. Titanium, zirconium, and their alloys have the characteristic of wetting non-metallic substances and a method of brazing non-metals has heretofore been disclosed, in which titanium in the form of its hydride is employed. In the brazing operation referred to, a coating of the powdered titanium hydride in a suitable carrier is applied to the surfaces to be joined and the objects are then heated in a non-oxidizing atmosphere with the coated surfaces in contact with a conventional brazing filler metal to a temperature higher than the liquidus temperature of the filler metal.

While the method of brazing by the use of titanium hydride referred to above is effective, it is open to the objection that it is difficult and awkward to apply satisfactory coatings of the hydride and, in some instances, the coating may be dislodged from the surfaces to be bonded in the course of handling and heating. To overcome such difficulties, brazing filler metals in the form of alloys of titanium and zirconium with such metals as silver and copper have been prepared and used successfully in brazing non-metallic objects. However, such alloys are difficult to prepare and fabricate into the desired wires and other forms for brazing use, since the alloys must be melted and cast in a vacuum or highly pure inert gas and the amount of titanium or zirconium that can be incorporated with copper, silver, or their alloys without impairing workability is limited. After cold working, alloys of titanium or zirconium with silver, copper, etc. must be annealed before further working and, unless the annealing is carried on under vacuum or in a highly purified inert gas, oxides, nitrides, etc. of titanium or zirconium are formed both at and beneath the surface of the alloy. Another difficulty encountered in the preparation of the brazing filler metals referred to results from the alloys being subject to precipitation hardening. This necessitates rapid cooling, as by quenching, after annealing and such cooling is difficult to achieve within the closed retort required to confine the vacuum or special gas atmosphere.

The present invention is, accordingly, directed to the provision of a novel brazing filler metal for use in joining objects, at least one of which is non-metallic, and of a method of joining such objects, which can be carried out by the use of the new filler metal. The filler metal of the invention is a composite material and it includes a metal capable of wetting non-metallic surfaces, but it is of such ductility that it can be fabricated by ordinary commercial procedures into wire and other forms required for brazing operations. The new filler metal comprises a central core of a metal of the group consisting of titanium, zirconium, thorium, and hafnium or of an alloy containing a substantial amount of such a metal, and an enclosing metallic sheath. The sheath may be a metal or alloy, which has a melting point substantially lower than that of the core, is capable of dissolving the core material in an amount of at least one per cent by weight, and is ductile. Numerous metals and alloys have the characteristics stated and are thus suitable for the sheath in the new filler metal, typical examples being silver, copper, silver-copper alloys, lead, lead-tin base alloys, silver-copper-zinc alloys, nickel, nickel-copper alloys, gold, gold alloys, iron, iron alloys, and aluminum. The preferred materials for the sheath are the face centered cubic, ductile metals having a melting point between 1000° F. and 2000° F. and a crystallographic lattice constant between 3.6 and 4.10, and alloys, in which such metals form a substantial component. The metals in the preferred group are thus silver, copper, gold, and aluminum and their alloys.

The amount of the active metal, that is, titanium, etc., in the core of the new filler metal should not be less than 1% by weight of the composite material and need not exceed about 15%, although, for many purposes, the amount of the active metal present in the core need not be much more than 3% by weight of the composite material. Preferably, the filler metal is made in the form of a wire, which may be produced as follows: A round bar of the sheath metal, which may be, for example, an alloy of 72% silver and 28% copper, is prepared by melting, casting, and rolling in accordance with conventional procedures and by the use of ordinary equipment, the bar having a diameter of about 1" and a length of about 18". A hole about 0.31" in diameter is drilled axially through the bar and a rod of the core material, for example, metallic titanium, which is slightly smaller in diameter than the hole, for example, 0.30", and 18" long, is inserted into the hole. The composite bar is then radially cold-swaged to cause the silver-copper envelope to close in on the titanium core and the swaging is continued until the cross-section of the bar is reduced about 50%. The bar is then annealed at about 1200° F. in the usual manner and the annealed swaged bar is processed into wire by the ordinary operations of rolling, drawing, or both. As both the silver alloy sheath and the titanium core are ductile, commercial fabricating procedures may be employed and the tight sheath about the core prevents degradation of the titanium during annealing in ordinary commercial annealing atmospheres. The final cored wire produced in the manner described contains about 15% by weight of titanium and is so ductile that it can be readily formed into rings, flattened, and given desirable shapes for brazing purposes.

The nature of the brazing filler metal of the invention and the method of using it will be understood by reference to the accompanying drawing, in which Fig. 1 is a sectional view showing a typical joint to be made by the use of the brazing filler metal of the invention;

Fig. 2 is a fragmentary view of the joint shown in Fig. 1 during the initial heating; and Fig. 3 is a view similar to Fig. 1 but on an enlarged scale and showing the joint completed.

In the practice of the method of the invention in joining by brazing two objects, at least one of which is non-metallic, there is formed in contact with the objects a molten body of a ductile metal, which has a lower melting point than any metal of the group consisting of titanium, zirconium, thorium, and hafnium and is capable of dissolving at least about 1% by weight of the metal of the group. A metal of the group defined is kept in contact with the molten body and goes into solution therein to form an alloy capable of wetting the non-metallic object and, as soon as the alloy is formed, the molten body flows through the joint in wetting contact with the opposed surfaces of the objects. Upon discontinuance of the heating and cooling, the joint is completed. The new composite brazing filler metal provides both the ductile metal and the group metal and the two metals are in such relationship to each other in the composite material as to facilitate the practice of the method.

The typical assembly shown in Fig. 1 consists of a metallic ring 10 of iron, nickel, or other high melting point metal, to which the non-metallic disc 11 is to be joined by brazing. The disc may be made, for example, of porcelain or other ceramic material, such as alumina, sillimanite, or the like. In the assembly shown, the ring is formed with an internal flange 10a and, in preparing the assembly for brazing, the disc 11 is placed within the ring upon the flange and a ring 12 of the composite filler metal of the invention is placed within the ring 10 in contact with the inner surface of the ring and the top surface of disc 11 and as close as possible to the cylindrical space 13 between the ring 10 and the periphery of the disc. The ring 12 consists, as above described, of a metallic sheath 12a, which may be made, for example, of the eutectic silver-copper alloy of 72% silver and 28% copper, and a core 12b, which may be metallic titanium. The core may vary from as little as 1% by weight of the composite filler metal to as much as 15% or more.

When the assembly has been prepared, it is placed within a heating chamber, which is then evacuated or filled with a highly purified inert gas, such as helium. The assembly is then heated and, when the temperature reaches 1435° F., the sheath of the filler metal melts and initially forms the molten body 14. In Fig. 2, the molten body is shown immediately after its formation and, since the sheath metal alone does not wet the ceramic, the body is illustrated in Fig. 2 as making high contact angles at 14a, 14b with the ceramic disc. The molten metal wets the surface of the ring 10 and it is shown as making low contact angles therewith at 14c, 14d. Since the molten metal does not wet the ceramic, the surface tension of the molten body prevents it from flowing into the cylindrical space 13.

As the heating continues, the core metal dissolves in the molten body of sheath metal and diffuses therethrough, until an alloy capable of wetting the ceramic is produced. As soon as such an alloy is formed, the molten alloy flows to fill the space 13 and also beneath the disc to float it free of flange 10a, as shown in Fig. 3. The filler metal alloy, because of its ability to wet the ceramic, makes low contact angles therewith at 14a', 14b' and makes similar angles with the metal ring 10 at 14c, 14d'. In the finished joint, there may be a residual portion 12b' of the core remaining, depending on the amount of the core metal originally present in the filler metal and the temperature to which the assembly was heated. The presence of such a residue is unobjectionable and it may be eliminated by heating to a higher temperature.

It is to be noted that, in the practice of the method by means of the new composite filler metal, the wetting of the non-metallic object by the molten metal does not occur until the amount of core metal required to make the joint has been dissolved, and that, as soon as the necessary amount of core metal has dissolved, the molten alloy will flow and form the joint. Accordingly, the use of the new filler metal makes it possible to produce joints with the minimum effective core metal content for a given temperature and this is desirable because an excessive amount of the core metal makes the alloy in the joint brittle, so that the joint is more susceptible to fracture resulting from thermal stresses. The new filler metal thus provides a means for forming in situ an alloy capable of wetting non-metallic surfaces and, by the formation of that alloy at the joint by the use of the composite filler metal, all the difficulties encountered in making joints by the use of the hydride coating and in producing and fabricating such an alloy are avoided.

In the appended claims, the term "metal" is to be understood as including both the metals identified and also alloys, in which the identified metals form a substantial component.

I claim:

1. A composite brazing filler material capable of wetting and joining non-metallic materials which comprises a central core containing a metal of the group, which consists of titanium, zirconium, thorium, and hafnium, said metal being present in an amount ranging from about 1% to about 15% by weight of the composite material, and a sheath tightly enclosing the core and made of a face centered cubic, ductile metal having a melting point between 1000° F. and 2000° F. and a crystallographic lattice constant between 3.6 and 4.10, the sheath metal, when molten, being capable of dissolving the active metal of the core in the amount of at least 1% of the weight of the sheath metal to form an alloy capable of wetting non-metallic materials.

2. A composite brazing filler material capable of wetting and joining non-metallic materials which comprises a central core containing a metal of the group, which consists of titanium, zirconium, thorium, and hafnium, and a sheath tightly enclosing the core and made of a ductile metal, which has a melting point lower than that of the core and in which the core metal is soluble in the amount of at least about 1% by weight of the sheath metal to form an alloy capable of wetting non-metallic materials, the active metal in the core ranging from about 1% to about 15% by weight of the composite material.

3. A composite brazing filler material capable of wetting and joining non-metallic materials which comprises a central core containing an active metal of the group, which consists of titanium, zirconium, thorium, and hafnium, and a sheath tightly enclosing the core and made of a metal of the group consisting of copper, gold, and silver, said active metal being present in the core in an amount ranging from about 1% to about 15% of the weight of the composite material.

4. A composite brazing filler material capable of wetting and joining non-metallic materials which comprises a central core containing a metal of the group, which consists of titanium, zirconium, thorium, and hafnium, and a sheath of aluminum tightly enclosing the core, the core metal being present in an amount ranging from about 1% to about 15% of the weight of the composite material.

5. The method of making a brazing alloy joint between two surfaces, at least one of which is non-metallic, which comprises placing in proximity to said surfaces a brazing composition made up of a core containing an active metal, which is a metal of the group consisting of titanium, zirconium, thorium, and hafnium and a surrounding sheath of a ductile metal, which has a lower melting point than the active metal and is capable, when molten, of dissolving the active metal of the core in the amount of at least 1% of the weight of the sheath metal to form an alloy capable of wetting non-metallic materials, applying heat to the brazing composition sufficient to melt a portion of the sheath metal and form a molten body thereof in contact with said surfaces, holding the brazing composition in contact with said molten body until such an amount of the active metal has dissolved in said molten body as to form an alloy, which wets said surfaces, and maintaining about said molten body an atmosphere substantially inert to the molten body of said alloy.

6. The method of claim 5 wherein the active metal of the core is present in an amount ranging from about 1% to about 15% of the weight of the composite material.

7. A composite brazing filler material capable of wetting and joining non-metallic materials which comprises a central core containing an active metal, which is a metal of the group made up of titanium, zirconium, thorium, and hafnium, and a sheath tightly enclosing the core and made of about 72% silver and about 28% copper by weight, the active metal of the core being present in an amount ranging from about 1% to about 15% of the composite material.

References Cited in the file of this patent

UNITED STATES PATENTS

| | | |
|---|---|---|
| 1,597,189 | Gero | Aug. 24, 1926 |
| 2,290,073 | Said | July 14, 1942 |
| 2,330,371 | Miller | Sept. 28, 1943 |
| 2,334,609 | Cox | Nov. 16, 1943 |
| 2,503,564 | Reeve | Apr. 11, 1950 |